No. 736,902. PATENTED AUG. 18, 1903.
F. R. WILLSON, Jr.
CONVEYING APPARATUS.
APPLICATION FILED JAN. 31, 1901.
NO MODEL. 4 SHEETS—SHEET 2.
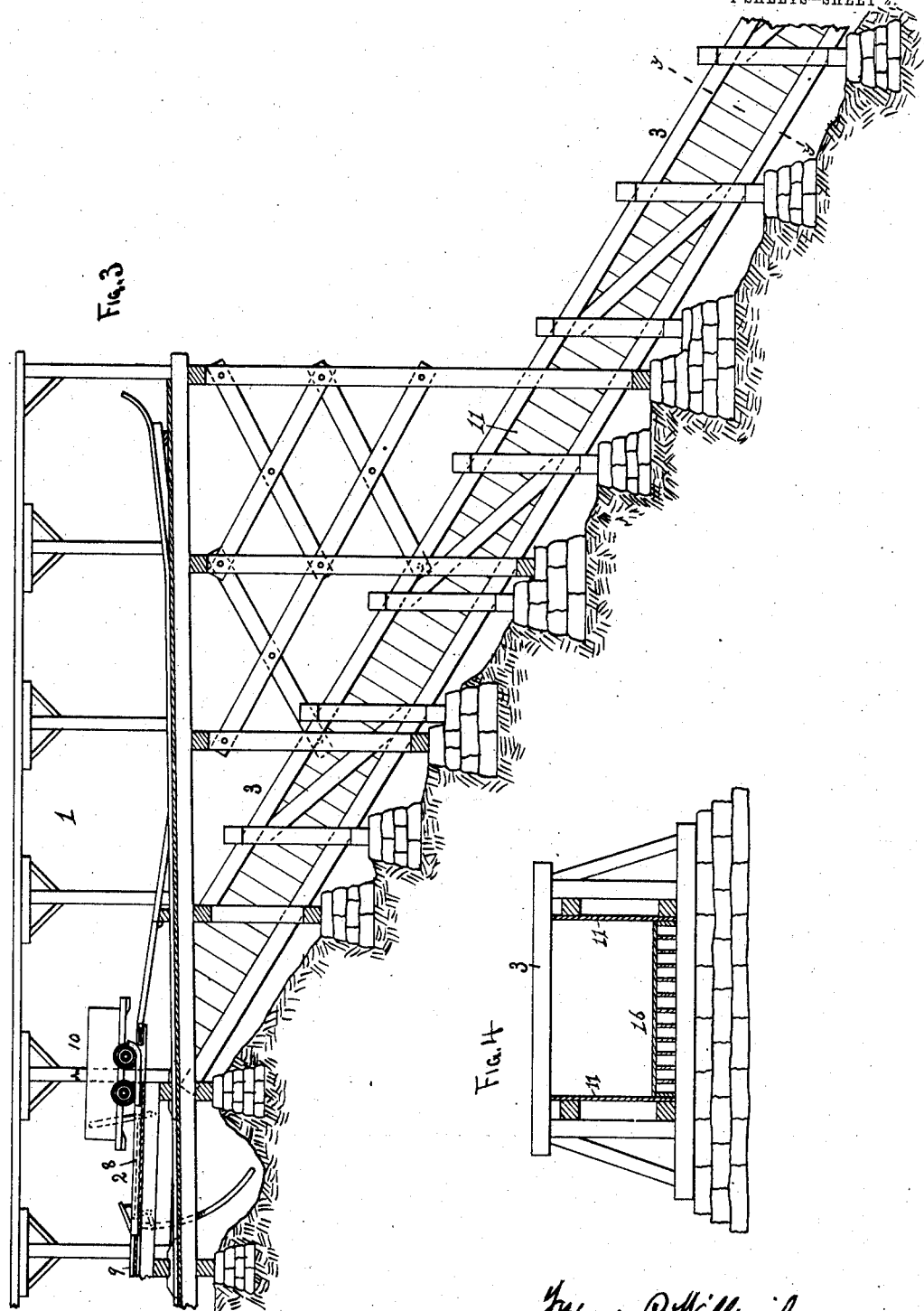
WITNESSES.
C. N. Woodward.
A. E. Williams Jr.
Freeman R. Willson Jr. INVENTOR
BY H. A. Bliss ATTORNEY.

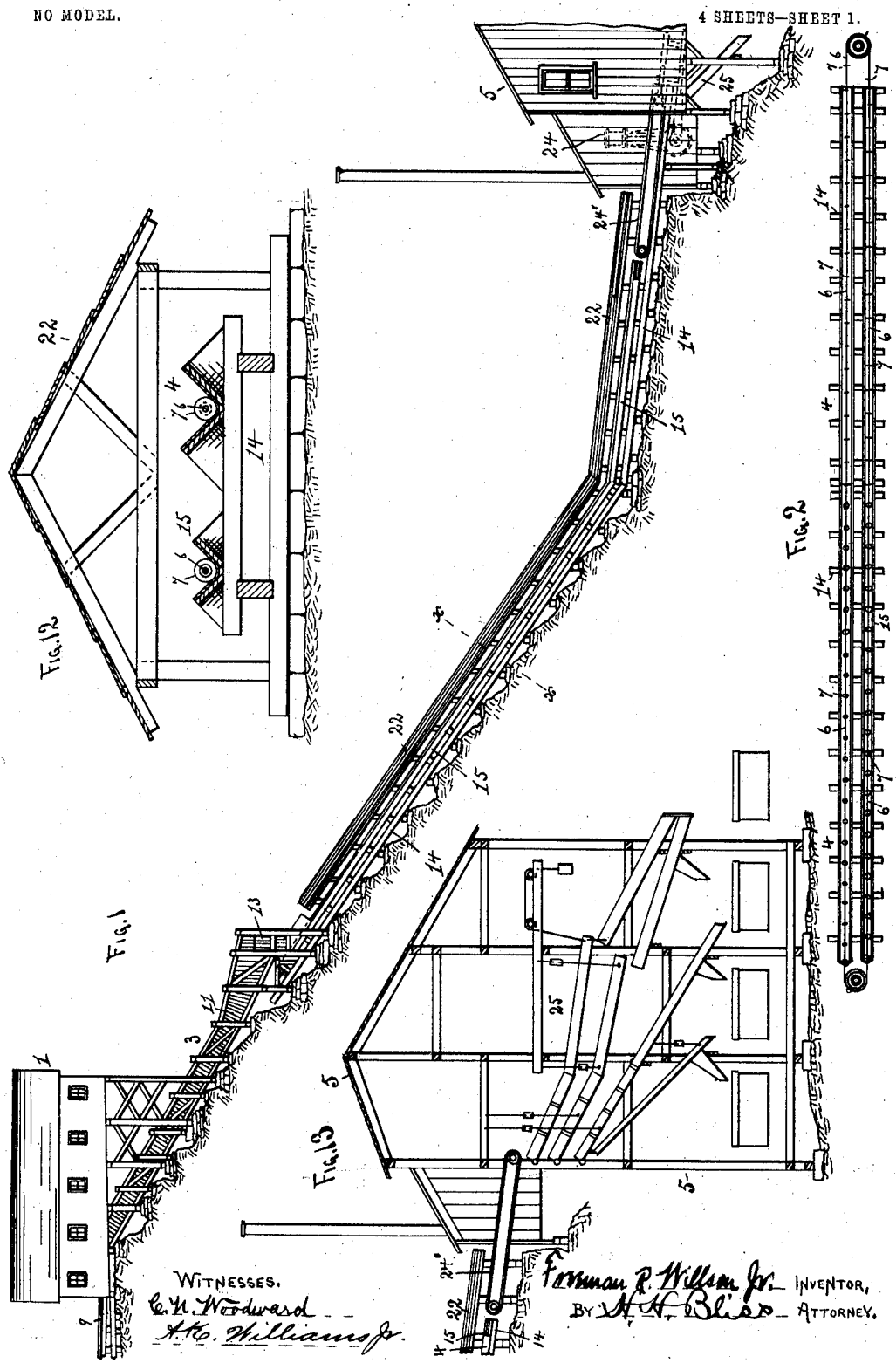

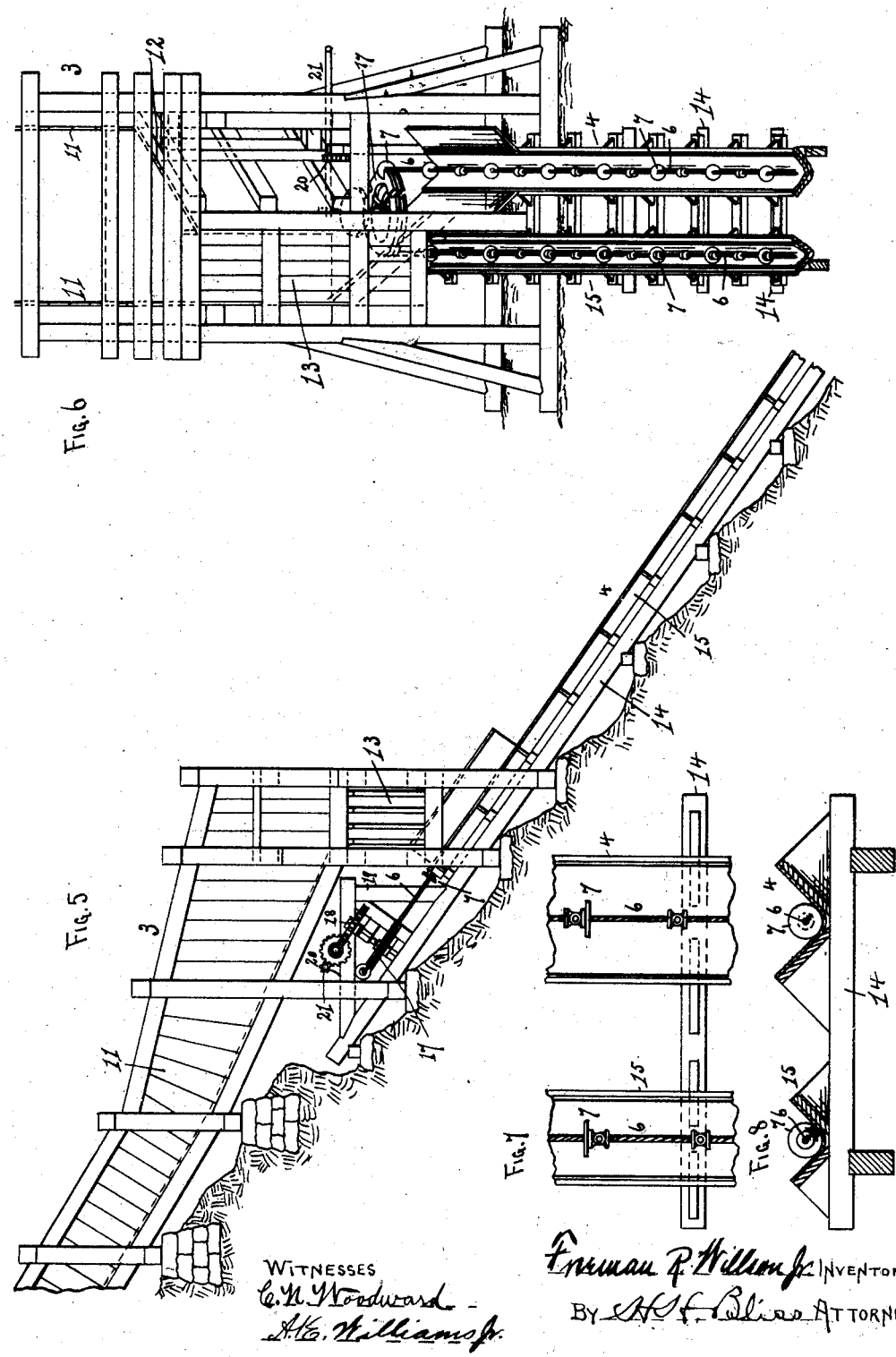

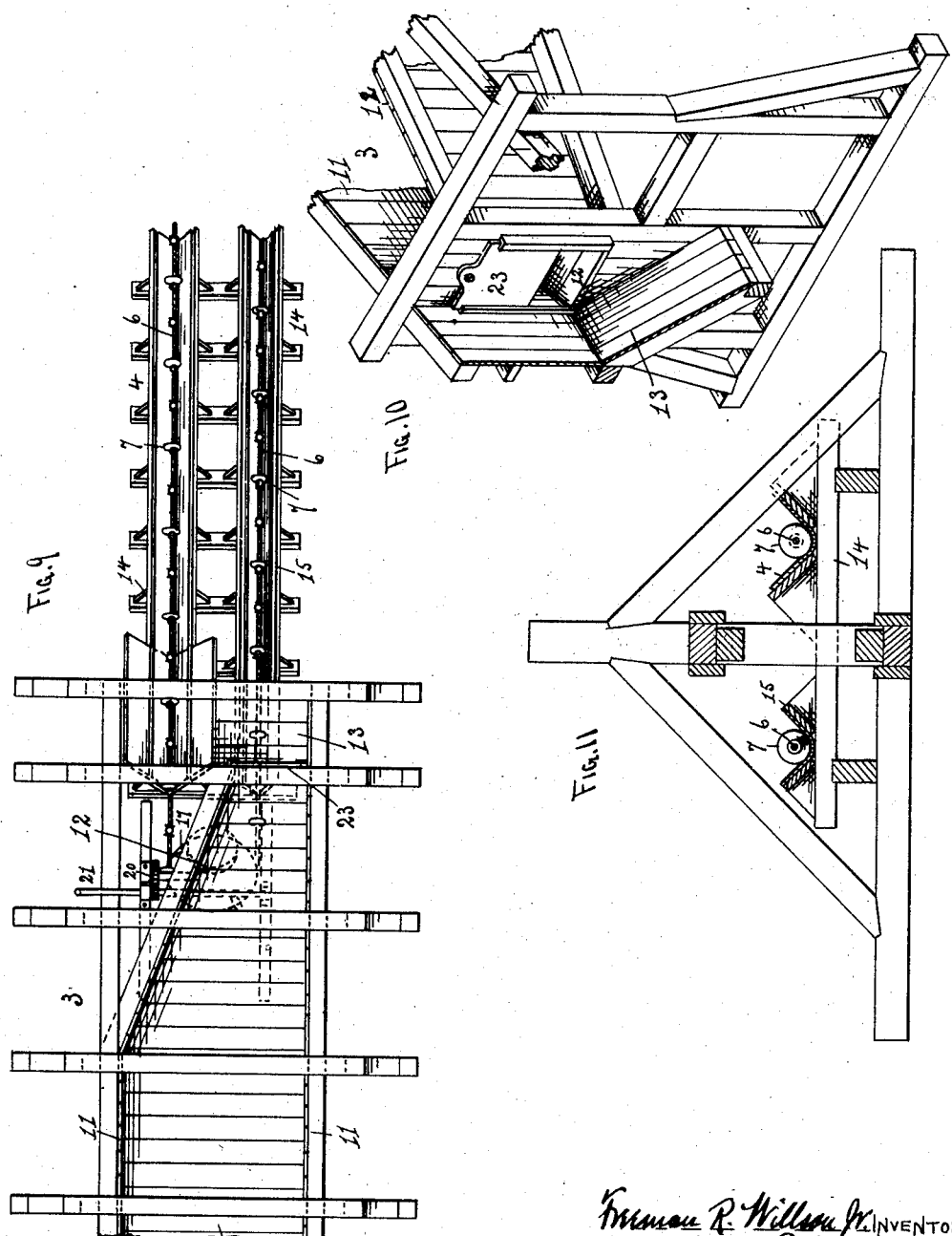

No. 736,902.
Patented August 18, 1903.

UNITED STATES PATENT OFFICE.

FREEMAN R. WILLSON, JR., OF COLUMBUS, OHIO, ASSIGNOR TO JOSEPH A. JEFFREY, OF COLUMBUS, OHIO.

CONVEYING APPARATUS.

SPECIFICATION forming part of Letters Patent No. 736,902, dated August 18, 1903.

Application filed January 31, 1901. Serial No. 45,459. (No model.)

*To all whom it may concern:*

Be it known that I, FREEMAN R. WILLSON, Jr., a citizen of the United States, residing at Columbus, in the county of Franklin and State of Ohio, have invented certain new and useful Improvements in Conveying Apparatus, of which the following is a specification, reference being had therein to the accompanying drawings.

Figure 1 is a side elevation of the apparatus as a whole. Fig. 2 is a plan view of parts of the structure shown in Fig. 1. Fig. 3 is a sectional side elevation of the upper or feed end of the apparatus, illustrating the construction of the tilting or dumping mechanism and the upper end of the loading hopper or chute. Fig. 4 is a cross-section on line *y y* of Fig. 3. Fig. 5 is a side elevation illustrating the construction of the lower end of the loading hopper or chute shown in Fig. 1, together with a section of the upper end of the retarding mechanism. Fig. 6 is an end elevation of the parts shown in Fig. 5. Figs. 7 and 8 are enlarged details of the retarding mechanism. Fig. 9 is a plan view of the parts shown in Figs. 5 and 6. Fig. 10 is a perspective view of a portion of the lower end of the loading-chute, illustrating the construction of the discharge mechanism. Fig. 11 is an enlarged cross-sectional detail of the retarding mechanism, illustrating a slight modification in the construction of the supporting-framework. Fig. 12 is a cross-section, enlarged, on the line *x x* of Fig. 1. Fig. 13 is a sectional detail of the picking-table and screening apparatus at the discharge end of the conveyer.

In this invention is comprised a receiving-chute or loading-hopper, and from which the material is conducted to another trough or chute leading to receiving hoppers or pockets or other receptacles, the conductor-chute being provided with one or more endless chains or cables having buckets or flights at intervals and traveling in the same direction as the flowing material, but at a slower speed than the natural flow of the material, whereby the material is retarded and fed to the receptacles at the discharge end of the conductor-chute in a uniform stream and only so fast as it can be disposed of to advantage.

By this means the material may be conducted down a chute that is much steeper than could be otherwise employed, as by the use of the retarding mechanism the material may be fed down the chute at any required speed, the speed being regulated by the nature of the material or the conditions or incline of the slope down which it is required to be carried.

The apparatus is more particularly applicable to the conducting of coal and similar products down steep inclines, to accomplish which it has heretofore been necessary to erect expensive and cumbersome systems of inclined railways and similar structures. With my device, however, the troughs, with the chains or cables and their retarding flights or buckets, may be erected at comparatively small expense and without regard to the degree of inclination at which they are run and can be easily adapted to the varying nature and incline of the ground or the topography of the locality where it is to be erected.

The apparatus can also be employed to convey the material along uneven ground or over ground of varying degrees of inclination, as illustrated in Fig. 1, or over ground which is a combination of alternating slopes and level ground. In other words, the apparatus may be readily adapted to all the irregularity of surface which is ordinarily met with in the mountainous or hilly countries where mining operations are usually conducted.

The structure comprises generally a platform, which is represented as a whole at 1, upon which the loaded cars are run, a tilting mechanism 2, by which the loaded cars may be tilted to discharge their loads, a receiving-chute or loading-hopper 3, into which the contents of the cars are dumped, a conducting-chute 4, down which the material will flow from the loading-chute, the chains or cables 6, having the retarding buckets or flights 7 and traveling slowly down the conductor-chute, and a picking-table 24' and a screening mechanism 25, inclosed in a building (indicated as a whole at 5) and into which the material is discharged from the conducting-chute.

Instead of the tilting platform the loading-chute 3 may lead directly from the storage bins or pockets, and instead of the screening apparatus the material may be arranged to discharge directly into cars or boats or other receptacles.

In Fig. 3 the tilting mechanism is shown, which is of the ordinary construction and consists in side rails 8, conforming to and registering with the railroad-rails 9, preferably inclined and leading from the mine or other source of supply of the material. The side rails 8 are suitably connected and hinged near their forward ends and having the curved removable extensions to support the wheels of the car 10 while the latter is being dumped.

The loading-receptacle 3 is in the form of a long chute or trough formed of a flat bottom 16 and sides 11 and is adapted to receive the material from the "tipple."

At the lower end the loading-chute 16 11 converges, as at 12, and opens into a smaller transverse inclined chute 13, the latter discharging into the upper end of the conductor-trough 4, this trough being preferably V-shaped in cross-section and supported by a framework 14 and discharging into any suitable receptacle at the lower end, as before mentioned.

15 is the return chute or trough designed to support the return half of the chain or cable 6.

6 is a wire cable running in the chute 4 15 and is provided at intervals with circular flights or carriers 7.

The upper end of the endless cable 6 passes around a cable-sheave 17, supported upon an upright shaft 18, journaled in a framework 19 beneath the loader-chute 16 11.

Motion is imparted to the shaft 18, as by a train of gears 20, from a horizontal power-shaft 21, which latter shaft may be driven from any suitable source of power, as an engine or motor. (Not shown.)

In Fig. 11 is shown a modification in the form of construction for the supporting-framework for the conductor-chutes, which may be employed to advantage in some localities. The conductor-chute may be covered and protected, as by a roof 22, as shown in Figs. 1 and 12, if required.

The lower end of the loading-chute will be provided with a valve or shut-off 23 to regulate the flow of the material from the chute, and thereby control the feed to the cable-trough 4.

The loading-chute may be of any desired size or capacity and adapted to receive the contents of the cars one after the other without affecting the action of the retarding-chute, as the valve perfectly regulates the flow of the material from the loader-chute without reference to the amount in the loading-chute or how often the charges of cars are dumped into it.

The car-loads, which generally amount to one or more tons, are dumped into the loading-chute at intervals more or less regular, but in masses equal to the capacity of the car, and these masses if suddenly fed to the retarding-chutes would clog them and prevent their proper action.

By converging the lower or outlet end of the loading-chute and providing it at this point with the valve I am enabled to perfectly control the supply of material and feed it to the retarding-conductor in a uniform stream equal to the capacity of the conveyer to dispose of it without clogging.

In Fig. 1 the power is shown as applied by an engine 24 or otherwise to the lower part of the endless cable 6, which plan is suitable where the guideway or trough is substantially straight from top to bottom.

By applying power to the lower end of the carrier I overcome the difficulty that arises from its tendency to be stopped along the lower part of its path and to become slack along said part, with a resulting danger of the material piling up in the region of the slackness. For some purposes, especially where the conveyers are very long, it is desirable to follow the plan herein provided—namely, of applying some of the power at the bottom and some at the top, so as to properly distribute the tension along the carrier and have it uniformly taut throughout its length.

When the apparatus as a whole is at work, the loading pocket or receptacle 3 will be more or less charged with the material, which can be withdrawn from it in a regulated and substantially continuous stream in the manner above described. This stream is delivered to the conductor-trough 4, which in the neighborhood of the loading-receptacle is at an inclination greater than that down which the material commences to slide. In fact, the inclination is such that the material if unobstructed would descend with great rapidity over a long distance and would be correspondingly without control. The endless and continuously-moving parts at 6 7, structurally similar to a "conveyer," act here in a manner diametrically opposite to that in which they act when working as a carrier or conveyer—that is to say, the flights at 7 instead of impinging upon and propelling the material receive the latter in successive charges or masses against their rear faces and impede its travel, the speed of the flights being, as aforesaid, less than that at which the material would travel downward if unimpeded.

If at any places in the total path of the traveling flights the inclination of the trough to the horizontal plane become sufficiently small—say thirty-five degrees or less—the material will no longer be advanced under the influence of gravity, and at such places the action of the flights is reversed—that is to say, they engage with charges or loads of the coal or other substance and positively advance them either to the point of final delivery or to a point where the inclination of the trough becomes again sufficiently steep to permit gravity to assist the conveyer.

Where the path of the loaded part of the conveyer comprises not only the steep inclined section or sections, but also one or more sections which are horizontal or nearly horizontal, the strains upon the different parts of the cable or flight-carrying part will vary to such extent that it is preferable to apply the driving power to the upper part, as in that case the returning leg of the cable can be used for receiving draft, while the descending leg can be permitted to have all of the "slack," and in such case the flights will more readily tend to rest upon and slide along the bottom of the trough and will not be liable to be pulled up therefrom, as would be the case if the draft were applied to the conveyer at the lower end.

I am aware that it has been proposed to employ as a device for lowering coal into vessels a hinged freely-swinging carrier-leg comprising a trunk or casing and a short carrier mounted in the trunk or frame, and all swinging around a common horizontal axis. A construction of this character would be entirely impracticable for the purposes which I accomplish. I aim to transport coal for many hundreds of feet. I employ an elongated trough which is permanent in position and is supported both along its lower portions and its upper by rigid devices and an endless carrier which is supported at its ends by parts entirely other than the supports for the trough. The two structures can be regarded as entirely independent, although correlated—the trough structure and the carrier mechanism. The carrier and its flights rest bodily upon the trough. The trough is arranged at a fixed inclination both to the vertical and to the horizontal, and consequently a great part of the gravity effect of the material is received by it, and the strain upon the carrier is reduced in proportion.

What I claim is—

1. In an apparatus for transporting material of the character described, the combination of the initial loading-receptacle adapted to receive intermitting charges of relatively large volumes, a conductor trough or guideway receiving the material from the said loading-receptacle and arranged at a relatively steep inclination, a series of traveling flights in the said trough or guideway, and means for moving the said flights downward therein at a speed less than that normally attainable by the material under the action of gravity when it is supported on said trough or guideway, substantially as set forth.

2. In an apparatus for transporting material of the character described from a relatively high point to a relatively low point, the combination of the initial loading-receptacle adapted to receive intermitting charges of relatively large volumes, means for delivering the said material from the charging-receptacle in approximately uniform stream, a conductor trough or guideway receiving the said stream of material and arranged at a relatively steep inclination whereby the material will normally tend to slide downward under the action of gravity, a series of traveling flights in the said trough or guideway in the path of the said material, and means for moving the said flights downward at a speed less than that attainable by the material under the action of gravity, substantially as set forth.

3. In an apparatus for transporting materials from a relatively higher point to a relatively lower point, the combination of a primary inclined chute, a second chute receiving material from the primary chute, mechanism for controlling the flow of the material from the first to the second, an endless conveyer-like mechanism having flights arranged to travel downward through the second chute at a speed less than that attainable by the material when moving under the action of gravity, and means for positively moving the said conveyer-like mechanism, substantially as set forth.

4. In a retarding-conveyer, the combination of a trough rigidly supported at a fixed inclination to the vertical and to the horizontal, whereby it partially supports the material while permitting it to flow by gravity, an endless carrier having flights at intervals, arranged to rest upon the bottom of the trough, means independent of the endless carrier for supporting it, means at the upper end of the endless carrier for supporting it, and means for moving the said endless carrier at a speed less than that of the material in the trough under the action of gravity, substantially as set forth.

5. In a retarding-conveyer, the combination of two approximately parallel troughs, both arranged at an inclination to the vertical and to the horizontal, frames supporting the lower end and the upper end of each trough rigidly in fixed position at such inclination, an endless carrier having flights at intervals, one half of said carrier and flights resting upon one of said troughs, and the other half resting upon the other trough, means for delivering material to the upper end of one of said troughs, said trough being arranged to partly support the said material while permitting it to slide or flow under the action of gravity, and means for applying power to the carrier, and moving it downward in the last said trough at a speed less than that of the flow of the material under the action of gravity, substantially as set forth.

6. In a retarding-conveyer, the combination with a trough rigidly supported at a fixed inclination to the vertical and to the horizontal, whereby the material rests upon it, and the endless carrier with flights resting bodily on the trough, of power mechanism connected to the endless carrier at its lower end, and adapted to drag downward, the loaded part of the conveyer, and keep it taut, substantially as set forth.

7. In a retarding-conveyer, the combination with a trough, having sections rigidly supported respectively at different inclinations both to the horizontal and to the vertical, means for supplying material to the trough, an endless carrier having flights at intervals arranged to move in said trough and adapted to retard the material in those portions of the trough in which it would flow by gravity owing to inclination of the trough and to advance the material in those portions of the trough in which the inclination is not so great, and means for moving the said endless carrier, substantially as set forth.

8. In an apparatus for transporting material, the combination of a trough or conduit for the material having a portion of its length disposed at an angle sufficiently great to cause the material therein to descend by gravity and another portion arranged at a less angle, an endless conveyer device situated in the said conduit and adapted to act as a retarding device in the more steeply inclined portion of the conduit and as a positive advancing or conveying device in the less steeply inclined portion and means for positively moving the conveying device in the direction in which the material moves and at a speed lower than that at which the material in the more steeply inclined portion would move by gravity if unretarded, substantially as set forth.

9. In a retarding-conveyer, the combination of an elongated trough arranged at a fixed inclination to the vertical and the horizontal, an elongated endless carrier with flights at intervals thereon moving downward in said trough, the active part of said carrier being relatively slack and resting bodily upon said trough and receiving support therefrom throughout the major part of its length, and means for driving said carrier at a speed less than that of the material flowing down the said trough under the action of gravity, substantially as set forth.

In testimony whereof I affix my signature in presence of two witnesses.

FREEMAN R. WILLSON, Jr.

Witnesses:
  P. W. HOLSTEIN,
  M. W. SHERWOOD.